US009042231B2

(12) United States Patent
Wang et al.

(10) Patent No.: US 9,042,231 B2
(45) Date of Patent: May 26, 2015

(54) METHOD AND APPARATUS FOR SUPPORTING UPLINK STARVATION AVOIDANCE IN A LONG TERM EVOLUTION SYSTEM

(71) Applicant: InterDigital Technology Corporation, Wilmington, DE (US)

(72) Inventors: Peter S. Wang, E. Setauket, NY (US); Jin Wang, Princeton, NJ (US); Stephen E. Terry, Northport, NY (US); Shankar Somasundaram, Sunnyvale, CA (US); Mohammed Sammour, Amman (JO)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 14/198,403

(22) Filed: Mar. 5, 2014

(65) Prior Publication Data

US 2014/0185448 A1 Jul. 3, 2014

Related U.S. Application Data

(63) Continuation of application No. 13/778,046, filed on Feb. 26, 2013, now Pat. No. 8,699,334, which is a continuation of application No. 12/046,859, filed on Mar. 12, 2008, now Pat. No. 8,385,196.

(60) Provisional application No. 60/894,741, filed on Mar. 14, 2007.

(51) Int. Cl.
*H04L 12/863* (2013.01)
*H04L 12/801* (2013.01)
*H04L 12/819* (2013.01)
(Continued)

(52) U.S. Cl.
CPC ............ *H04L 47/6285* (2013.01); *H04L 47/10* (2013.01); *H04L 47/14* (2013.01); *H04L 47/215* (2013.01); *H04W 72/1205* (2013.01); *H04W 72/1289* (2013.01); *H04W 28/0252* (2013.01); *H04W 28/0278* (2013.01)

(58) Field of Classification Search
None
See application file for complete search history.

(56) References Cited

U.S. PATENT DOCUMENTS 5,654,979 A 8/1997 Levin et al.
5,819,177 A 10/1998 Vucetic et al.
(Continued)

FOREIGN PATENT DOCUMENTS

EP 0804006 10/1997
EP 1708524 10/2006
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.3.0, Dec. 2007, 121 pages.
(Continued)

*Primary Examiner* — Otis L Thompson, Jr.
(74) *Attorney, Agent, or Firm* — Julian F. Santos

(57) ABSTRACT

A method and apparatus for uplink (UL) starvation avoidance includes determining a current buffer status information. The current buffer status information is reported to an evolved Node B (eNB). A grant that includes a determination of a number of tokens a wireless transmit/receive unit (WTRU) may accumulate is received from the eNB.

22 Claims, 5 Drawing Sheets

500

START
A WIRELESS TRANSMIT/RECEIVE UNIT (WTRU) DETERMINES ITS BUFFER STATUS. — 510
THE WTRU TRANSMITS A GRANT REQUEST TO AN EVOLVED NODE B (eNB). — 520
THE eNB SIGNALS A GRANT TO THE WTRU. — 530
END

(51) Int. Cl.
*H04W 28/02* (2009.01)
*H04W 72/12* (2009.01)

(56) References Cited

U.S. PATENT DOCUMENTS

| | | | | |
|---|---|---|---|---|
| 6,115,390 | A | 9/2000 | Chuah | |
| 6,192,032 | B1 | 2/2001 | Izquierdo | |
| 6,347,077 | B1 | 2/2002 | Ginzboorg | |
| 6,801,500 | B1 | 10/2004 | Chandran | |
| 6,950,395 | B1 | 9/2005 | Bashandy et al. | |
| 6,980,552 | B1 | 12/2005 | Belz et al. | |
| 7,349,338 | B2 | 3/2008 | Balachandran et al. | |
| 8,699,334 | B2 * | 4/2014 | Wang et al. | 370/230 |
| 2004/0184404 | A1 | 9/2004 | Carpenter et al. | |
| 2005/0265301 | A1 | 12/2005 | Heo | |
| 2006/0146761 | A1 | 7/2006 | Kim et al. | |
| 2007/0036113 | A1 | 2/2007 | van der Gaast et al. | |
| 2007/0115817 | A1 | 5/2007 | Gupta et al. | |
| 2009/0219815 | A1 | 9/2009 | Insler et al. | |
| 2011/0310742 | A1 * | 12/2011 | Liu et al. | 370/235.1 |

FOREIGN PATENT DOCUMENTS

| | | |
|---|---|---|
| JP | 2000-183880 | 6/2000 |
| JP | 2004-320774 | 11/2004 |
| JP | 2004-320775 | 11/2004 |
| JP | 2009-505574 | 2/2007 |
| KR | 20030057648 A | 7/2003 |
| WO | WO-02/21773 | 3/2002 |
| WO | WO-2007/021608 | 2/2007 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V0.9.0, Mar. 2007, 89 pages.

"3rd Generation Partnership Project; Technical Specification Group Radio Access Network; Evolved Universal Terrestrial Radio Access (E-UTRA); Medium Access Control (MAC) protocol specification, Release 8", 3GPP TS 36.321 V8.0.0, Dec. 2007, 23 pages.

"3rd Generation Partnership Project; Technical Specification Group Radio Access Network; Feasibility study for evolved Universal Terrestrial Radio Access (UTRA) and Universal Terrestrial Radio Access Network (UTRAN) (Release 7)", 3GPP TR 25.912 V7.1.0, Sep. 2006, 56 pages.

"3rd Generation Partnership Project; Technical Specification Group Radio Access Network; Feasibility study for evolved Universal Terrestrial Radio Access (UTRA) and Universal Terrestrial Radio Access Network (UTRAN) (Release 7)", 3GPP TR 25.912 V7.2.0, Jun. 2007, 64 pages.

"3rd Generation Partnership Project; Technical Specification Group Radio Access Network; Feasibility Study for Evolved UTRA and UTRAN (Release 7)", 3GPP TR 25.912 V0.1.7, Jun. 2006, 64 pages.

"3rd Generation Partnership Project; Technical Specification Group Radio Access Network; Physical layer aspects for evolved Universal Terrestrial Radio Access (UTRA) (Release 7)", 3GPP TR 25.814 V7.1.0, Sep. 2006, 132 pages.

"3rd Generation Partnership Project; Technical Specification Group Radio Access Network; Requirements for Evolved UTRA (E-UTRA) and Evolved UTRAN (E-UTRAN) (Release 7)", 3GPP TR 25.913 V7.3.0, Mar. 2006, 18 pages.

"Extended European Search Report", Ref. EP-21056362, European Application No. 12156502.2-2416, Jun. 21, 2012, 6 pages.

"Japanese Notice of Rejection", Japanese Application No. 2012-116008, Sep. 17, 2013, 4 Pages.

"Japanese Notice of Rejection (English Translation)", Japanese Application No. 2012-116008, Sep. 17, 2013, 5 Pages.

"Taiwanese Office Action", Taiwanese Application No. 097108942, Oct. 9, 2013, 10 Pages.

"Taiwanese Office Action (English Translation)", Taiwanese Application No. 097108942, Oct. 9, 2013, 7 Pages.

Alcatel-Lucent, "Signaling Resource Allocations in DL Control Channel", 3GPP Tdoc R1-070410, 3GPP TSG-RAN WG1 Meeting #47bis, Sorrento, Italy, Jan. 15-19, 2007, 10 pages.

Huawei, "Email Agreement: Method for uplink scheduling in LTE", 3GPP Tdoc R2-070299, 3GPP TSG-RAN WG2 #56bis, Sorrento, Italy, Jan. 15-19, 2007, 16 pages.

Huawei, "MBR and AMBR Enforcement in UL", 3GPP Tdoc R2-070494, 3GPP TSG RAN2 #57; St. Louis, Feb. 12-16, 2007, 4 Pages.

Samsung, "Complexity aspects of UE based solution", 3GPP Tdoc R2-070296, 3GPP TSG-RAN2 Meeting #56bis, Sorrento, Italy, Jan. 2007, 3 Pages.

Vodafone, et al., "Prioritised bit rate (aka Minimum Bit rate) for LTE", 3GPP Tdoc R2-063404, 3GPP TSG RAN WG2 #56, Riga, Latvia, Nov. 6-10, 2006, 4 pages.

Vodafone Group, "Overview to an Implementation of the Minimum Bitrate & Priority Scheme", 3GPP Tdoc R2-062960, 3GPP TSG RAN WG2 #55, Seoul, Korea, Oct. 9-13, 2006, 3 Pages.

* cited by examiner

METHOD AND APPARATUS FOR SUPPORTING UPLINK STARVATION AVOIDANCE IN A LONG TERM EVOLUTION SYSTEM

CROSS REFERENCE TO RELATED APPLICATIONS

This application is a continuation of U.S. patent application Ser. No. 13/778,046, filed Feb. 26, 2013, which is a continuation of U.S. patent application Ser. No. 12/046,859, filed Mar. 12, 2008, now U.S. Pat. No. 8,385,196, which claims the benefit of U.S. Provisional Patent Application Ser. No. 60/894,741, filed Mar. 14, 2007. Each of the above-referenced applications is incorporated by reference herein.

FIELD OF INVENTION

This application is related to wireless communications.

BACKGROUND

One of the efforts for the third generation partnership project (3GPP) long term evolution (LTE) program is to bring new technology, new architecture and new methods into the new LTE settings and configurations. The LTE program is undertaken in order to provide improved spectral efficiency, reduced latency, and better utilization of radio resources, thereby providing faster user experiences and richer applications and services with less associated cost.

The objective of the evolved universal terrestrial radio access (E-UTRA) and universal terrestrial radio access network (UTRAN) is to develop a radio access network geared toward a high-data-rate, low-latency, packet-optimized system having improved system capacity and coverage. In order to achieve this, an evolution of the radio interface as well as the radio network architecture may be needed. For example, instead of using the code division multiple access (CDMA) air interface technology, such as is currently used in 3GPP, orthogonal frequency division multiple access (OFDMA) and frequency division multiple access (FDMA) may be used in the downlink (DL) and uplink (UL) transmissions, respectively. In addition, LTE may employ an all packet switched service, which would mean that all voice calls would be made on a packet switched basis.

In a scenario where radio resources are limited, high priority services, such as video conferencing, may attempt to acquire as much available radio resources as possible from those assigned to a wireless transmit/receive unit (WTRU). Since the network (NW) does not have any control over how granted resources are shared between applications, this may cause lower priority flows, such as hyper text transfer protocol (HTTP) flows, to be starved when a higher priority flow scales up to the available bandwidth.

In high speed uplink packet access (HSUPA), enhanced UL was built on the existing quality of service (QoS) model. In this model, when the network grants a radio resource to a WTRU, the WTRU is responsible for selecting which uplink QoS flow to serve, using the associated priority for each flow provided by the radio resource control (RRC) signalling. In this scheme, for the network to avoid resource starvation of lower priority flows, it may be required to provide those flows the same priority as the higher priority flows. However, by essentially aggregating these flows together, the WTRU assigns each flow equal transmission rights to each queue.

There are two proposals to solve UL starvation problem in radio access network 2 (RAN2). One is an NW centric solution and the other one is a WTRU centric solution. The NW centric solution is characterized by post-transmission traffic policing that is done by the NW after it receives data from the WTRU. No guaranteed bit rate (GBR), maximum bit rate (MBR) and prioritized bit rate (PBR) information should be transmitted to the WTRU.

A WTRU centric solution may include the pre-transmission of traffic policing. The traffic policing is performed by the WTRU before data is transmitted over the air, and the GBR, MBR and PBR information may be transmitted to the WTRU at radio bearer (RB) establishment or modification. A WTRU centric solution may be used for UL starvation avoidance in LTE and may be specified based on a number of token buckets. FIG. 1 shows an example token bucket configuration 100.

As shown in FIG. 1, tokens are added to each bucket in accordance with a certain rate, (e.g., tokens/section). In order to schedule and send a packet of size X tokens from the WTRU, the WTRU checks the current token bucket size to see if there are sufficient tokens to allow the sending of this packet, (i.e., if packet size <=token bucket size), and if so, the WTRU may send the packet. If there are not sufficient tokens to allow the sending of the packet, the WTRU will not send the packet at the present time, but may send it once a sufficient number of tokens have been accumulated.

There are, however, various issues when the WTRU centric solution is used for UL starvation avoidance in the LTE system. Since the relation between the buffer status reporting (BSR) and the configured MBR/GBR has not been addressed in RAN2, an impending grant loss problem may arise. If a grant loss occurs, signaling overhead, resource allocation loss, and the like may arise.

In general, grant loss refers to the WTRU receiving a grant but not being able to fully utilize it. Grant losses may occur since the WTRU does not know with what rate it will receive grants, making it difficult for the WTRU to determine upfront whether a certain buffer level will exceed the configured MBR/aggregate MBR (aMBR) when this buffer level is handled. So there is not currently a mechanism for the WTRU to take the configured MBR/aMBR into account when reporting the BSR. As a result, a situation might occur in which a WTRU reports a certain buffer level, but when it is obtaining UL grants for handling this buffer level, it is not allowed to schedule the concerning SAE bearer because that would mean crossing the configured MBR/aMBR. This is what may be referred to as a "grant loss". The grant loss may occur even if an evolved Node B (eNB) is only providing grants corresponding to data indicated in the BSR.

It would therefore be beneficial to provide a method and apparatus for supporting UL starvation avoidance in an LTE system.

SUMMARY

A method and apparatus for uplink (UL) starvation avoidance is disclosed. The method includes determining a current buffer status information. The current buffer status information is reported to an evolved Node B (eNB). A grant that includes a determination of a number of tokens a wireless transmit/receive unit (WTRU) may accumulate is received from the eNB.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
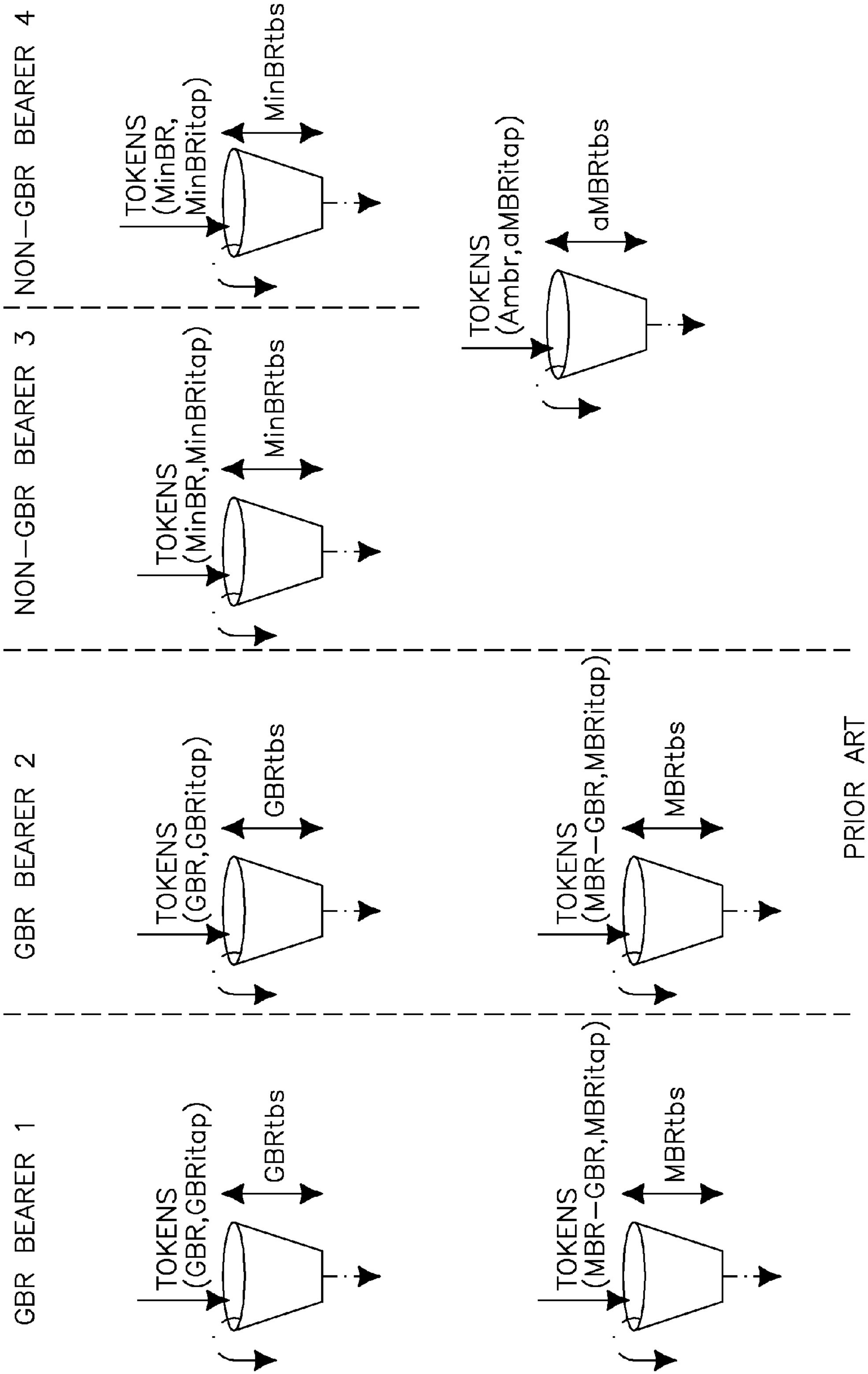
FIG. 1 shows an example token bucket configuration.
Figure 2:
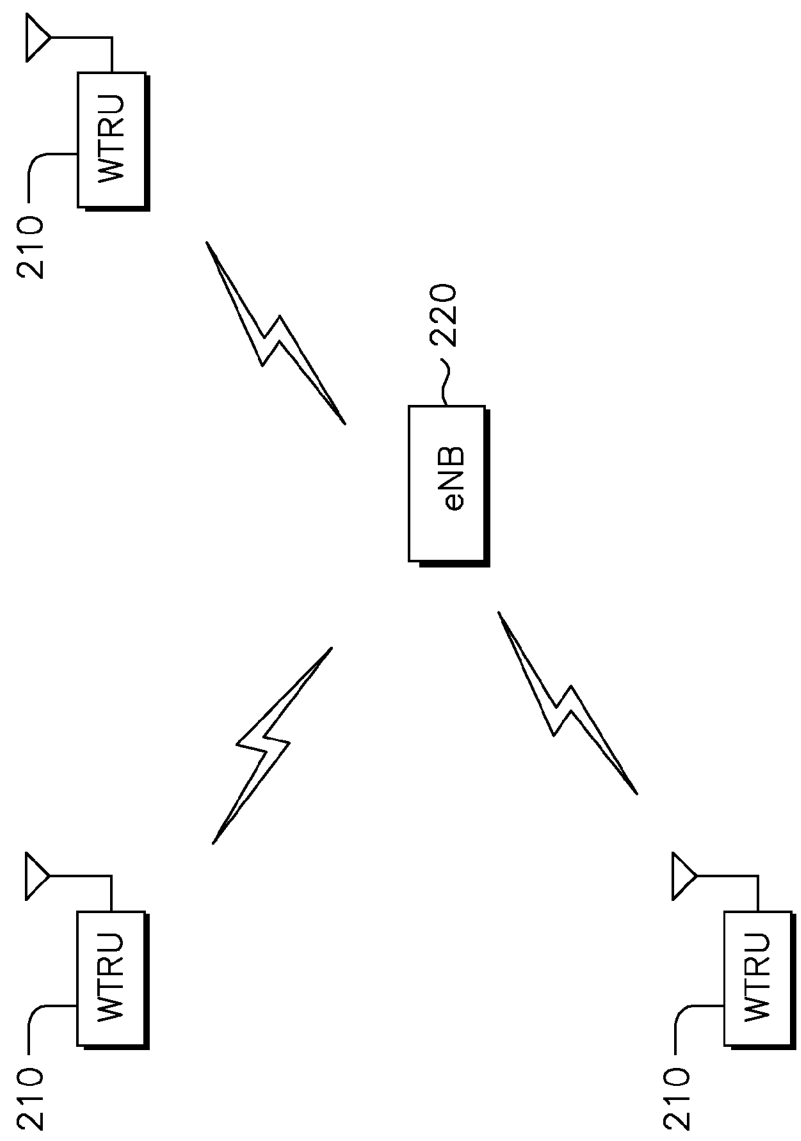
FIG. 2 shows an example wireless communication system including a plurality of WTRUs and an eNB.

FIG. 2 shows a wireless communication system 200 including a plurality of WTRUs 210 and an eNB 220. As shown in FIG. 2, the WTRUs 210 are in communication with the eNB 220. It should be noted that, although an example configuration of WTRUs 210 and base station 220 is depicted in FIG. 2, any combination of wireless and wired devices may be included in the wireless communication system 200.

Figure 3:
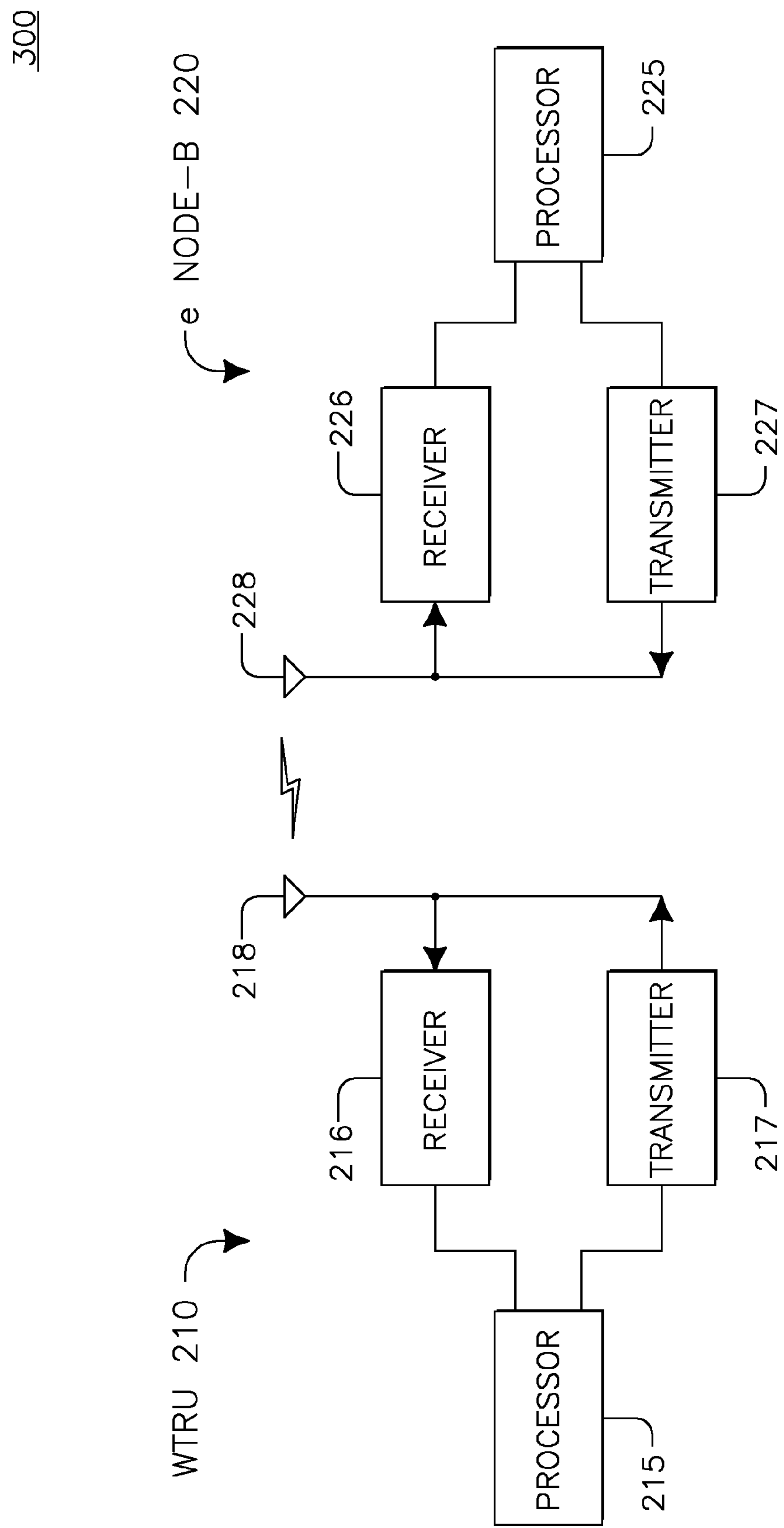
FIG. 3 is an example functional block diagram of a WTRU and the eNB of FIG. 2.

FIG. 3 is a functional block diagram 300 of a WTRU 210 and the eNB 220 of the wireless communication system 200 of FIG. 2. As shown in FIG. 3, the WTRU 210 is in communication with the eNB 220 and both are configured to perform a method of supporting uplink starvation avoidance.

In addition to the components that may be found in a typical WTRU, the WTRU 210 includes a processor 215, a receiver 216, a transmitter 217, and an antenna 218. The processor 215 is configured to perform a method of supporting uplink starvation avoidance. The receiver 216 and the transmitter 217 are in communication with the processor 215. The antenna 218 is in communication with both the receiver 216 and the transmitter 217 to facilitate the transmission and reception of wireless data.

In addition to the components that may be found in a typical eNB, the eNB 220 includes a processor 225, a receiver 226, a transmitter 227, and an antenna 228. The processor 225 is configured to perform a method of supporting uplink starvation avoidance. The receiver 226 and the transmitter 227 are in communication with the processor 225. The antenna 228 is in communication with both the receiver 226 and the transmitter 227 to facilitate the transmission and reception of wireless data.

Figure 4:
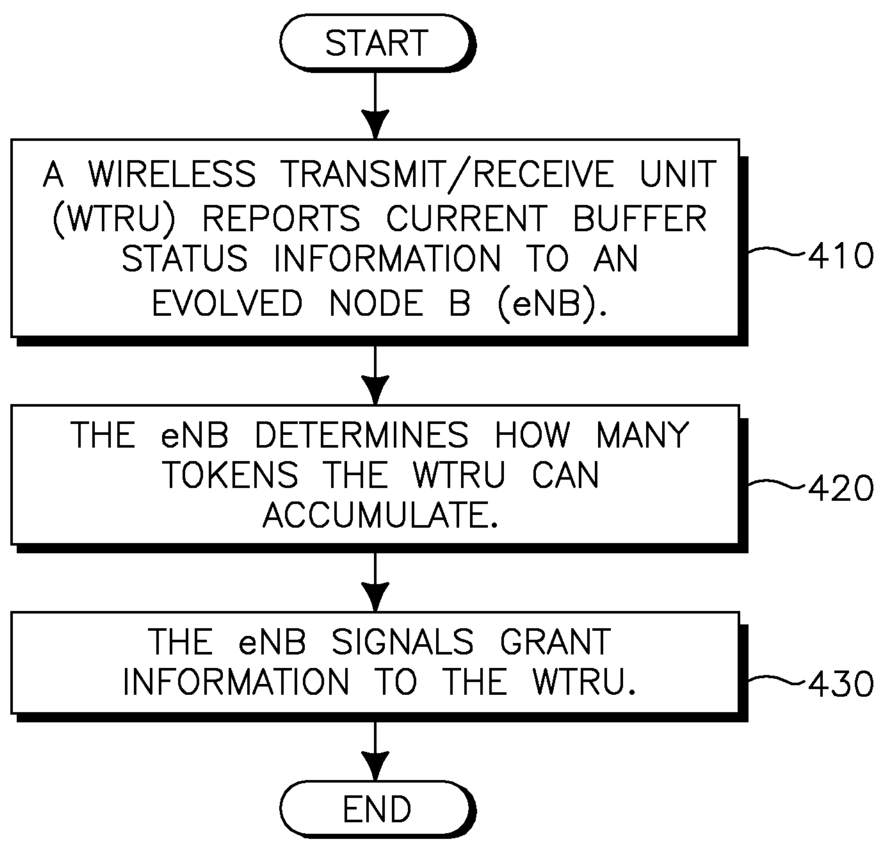
FIG. 4 is a flow diagram of a method of supporting UL starvation avoidance.

FIG. 4 is a flow diagram of a method 400 of supporting UL starvation avoidance. In step 410, the WTRU 210 reports current buffer status information to the eNB 220. This information may include information for some or all RBs, and may be directed to preventing a grant loss. The information may include buffer occupancy (BO) information, token bucket size of each RB for PBR, GBR MBR and eMBR respectively, token accumulation pattern at the WTRU, power headroom, and the like.

The BO information may be for one RB, a group of RBs, or all RBs, while the power headroom is for all RBs. The token size and token accumulation pattern may be for PBS, GBR, MBR and aMBR, respectively, for RBs. Alternatively, the aggregate number of tokens for several RBs are reported, and different aggregates may be reported separately. For example, aggregate tokens for GBS, MBR and eMBR may be reported independent of one another. Since a grant is per WTRU, the total number of tokens the WTRU 210 may utilize can provide an efficient way for scheduling a grant.

During the reporting in step 410, the WTRU 210 may report a fraction of tokens relative to the maximum token bucket size. For example, two (2) bits may be used to indicate that the WTRU 210 has 0 to ¼, ¼ to ½, ½ to ¾, or ¼ to 100 percent of the maximum token bucket size. It should also be noted that the two bits may be defined to support non-uniform ranges such as zero tokens, less than ¼ tokens, between ¼ and ½ tokens, greater than ½ tokens and the like.

By way of example, if 2 bits are used to indicate uniform range, "00" may be utilized for the range 0 to ¼, "01" for the range ¼ to ½, "10" for the range ½ to ¾, and "11" for the range ¾ to 100 percent. It should be noted that any combination of the bits may be used to indicate different ranges apart from those described. For non-uniform ranges, similar rules can be used, (e.g., "00" indicating zero tokens, "01" indicating less than ¼ tokens, and the like).

As described above, the WTRU 210 reports all or only a partial amount of information relating to the WTRU 210 to the eNB 220 in order to aid the eNB 220 with synchronization. Accordingly, the eNB 220 is aware of the WTRU's situation and can issue an accurate grant decision to aid in avoiding a grant loss. Additionally, the WTRU 210 may report for each RB, a group of RBs, all RBs, only high priority RB or any combination. The WTRU 210 can also specify in its buffer status, (e.g., grant request), a target time by which it would accumulate enough tokens to send at least one packet, (e.g., the smallest transport block (TB) size), so that the eNB 220 would be able to schedule the grant at or after the time indicated. The WTRU 210 can report any part, or all, of the information every transmission time interval (TTI) or every several TTIs that may be configured by RRC signalling during the RB establishment or modification process.

The WTRU 210 may transmit its report or token bucket information (step 410) periodically or it may be triggered by a pre-defined event. The events that may be utilized to trigger the report include events where the values for the information described previously exceed or fall below a threshold. For example, if an amount of tokens for a certain RB, or RBs, falls below a pre-defined threshold, the WTRU 210 may be triggered to report. The thresholds may be configured by RRC signaling at RB establishment and may be defined as fractions of the maximum token bucket size.

In this manner, the WTRU 210 status information, (e.g., buffer status), may be evaluated on a sliding window by the WTRU 210, but sent to the eNB 220 every TTI or after more than one TTI.

In step 420, the eNB 220 determines how many tokens the WTRU 210 can accumulate. In one embodiment, a weight is provided to each bucket corresponding to each application and signal to the network. These weighted values may be formed into a cumulative value to be signaled to the WTRU 210. Even if there are multiple RBs on different WTRUs 210 that are all transmitting packets at the same rate, depending on application priority, some WTRUs 210 might require more resources. Accordingly, the priorities can be shared between different WTRUs 210 based on the signaled weight from the NW.

Once the eNB 220 has all of the information it requires to make a grant allocation, the eNB 220 signals the grant allocation to the WTRU 210 (step 430). It should be understood that the eNB 220 may signal a grant allocation to an individual WTRU 210, a group of WTRUs 210, or all WTRUs 210 in the wireless communication system 200.

Figure 5:
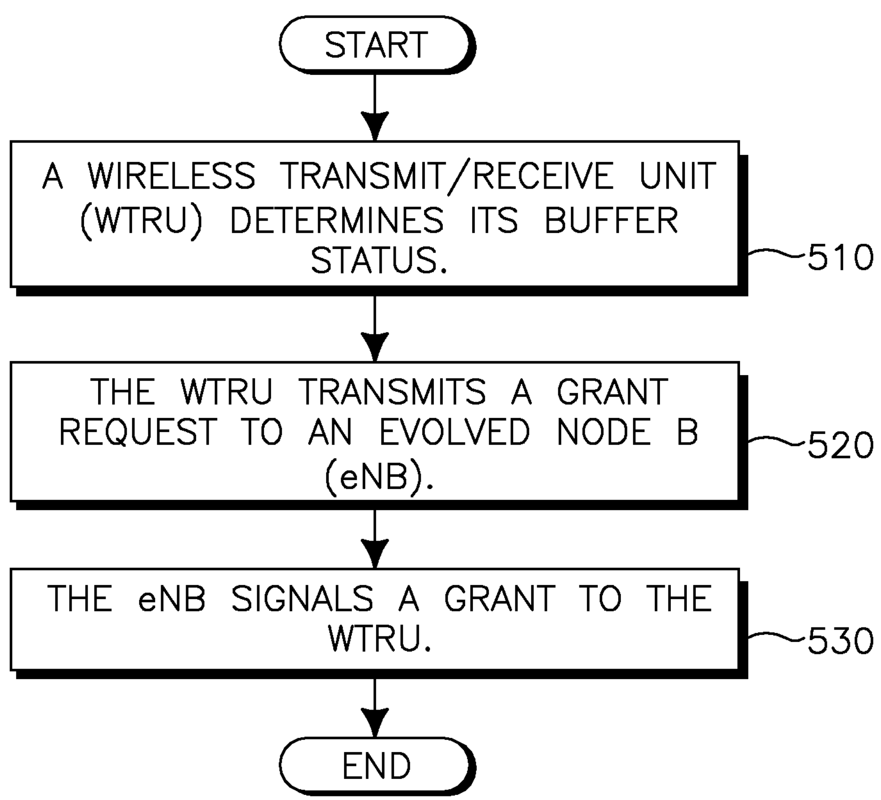
FIG. 5 is a flow diagram of an alternative method of supporting UL starvation avoidance.

FIG. 5 is a flow diagram of an alternative method 500 of supporting UL starvation avoidance. In step 510, the WTRU 210 determines its buffer status. In one example, the WTRU 210 may calculate and evaluate its buffer status and transmit a grant request to the eNB 220 based upon the evaluation (step 520).

The grant request can be a relative or absolute request that is sent every TTI or every several TTIs. Whether to send relative or absolute grant request and how often the grant should be sent from the WTRU should be configured at the RB establishment or modification stage through the RRC signalling. For example, a relative grant request is relative to the value used before and change is signalled to the WTRU 210 so that the WTRU 210 can derive the actual grant from the previous grant and current grant. For an absolute grant, it the value that WTRU 210 should use is indicated without the need for the WTRU 210 to make any derivations.

The grant request may be in the form of a "Happy Bit" where a single bit, or multiple bits, are transmitted to the eNB 220 in Happy Bit format. If a single bit grant request is utilized, then the single bit should be representative of the evaluation results for all different attributes, such as WTRU buffer occupancy status, packet information, power headroom, token headroom, (e.g., for PBR, GBR, MBR, aMBR) of all RBs, and the like.

The Happy Bit may represent the status for one RB or only an attribute of each RB, and may be evaluated on a sliding window. The Happy Bit may indicate every RB, high priority RBs, or any combination thereof, and may be reported the eNB 220 every TTI or after a number of TTIs. The Happy Bit may also indicate the amount of the grant request the WTRU 210 desires.

If the grant request includes multiple bits, one bit can be representative of all attributes of one RB or a group of RBs, (e.g., with similar properties such as priority, and the like), or the one bit can be representative of one attribute, (e.g., token headroom, BO, or power headroom) of all RBs. Additionally, multiple bits can be used as an index indicating various combinations of the WTRU's 210 status for the grant request. For example, the bits may indicate if the WTRU 210 is token, power or data limited. The buffer status report (BSR) can be used to represent the grant request from the WTRU 210 if there are more bits to be used for grant request purposes.

Table 1, below, shows an example index indicating a mapping that reflects different grant to status indication requests.

TABLE 1

| Grant Index | Indications |
|---|---|
| 000 | Token limited |
| 001 | Power limited |
| 010 | Data limited |
| 011 | Token limited & Power limited |
| 100 | Token limited & Data limited |
| 101 | Power limited & Data limited |
| 110 | Token, Power & Data limited |
| 111 | No change |

As shown in Table 1 above, various index values indicate whether the WTRU 210 is token limited, power limited, data limited, or any combination thereof. It should be noted that although Table 1 shows an example mapping, other mappings may also be utilized, and other limitations may be reported. For example, the WTRU 210 may include that the number of TTIs given to the WTRU 210 to transmit its data were insufficient. The eNB 220, after receiving information from the WTRU 210, signals a grant to the WTRU 210 (step 530).

In order to support the UL starvation avoidance, RRC signaling may be required that includes parameters directed toward the support. Table 2 below shows example RRC parameters for supporting UL starvation avoidance, where a type is mapped to an information element (IE).

TABLE 2

| Type | New IE parameters |
|---|---|
| Decide Explicit or Implicit Approach | Whether Explicit WTRU Reporting or WTRU grant request method will be used |
| | Whether a token bucket is allowed to become negative or not |
| Explicit WTRU Reporting | If the reporting is for one RB, a group of RBs or all RBs |
| | If periodic, event triggerd, or event triggered periodic WTRU reporting will be used |
| | If event triggered reporting is to be used, then specify the Threshold(s) to trigger WTRU report |
| | If reporting is every TTI or several TTIs |
| | If WTRU has to report every several TTIs then specify the exact number of TTIs |
| WTRU Grant Request | If absolute or relative grant will be used |
| WTRU Grant Request | If single or multiple Happy bits will be used |
| | If periodic reporting is used, specify the Grant reporting cycle |
| | If per RB or group of RB's "Happy bit" will be reported |
| | Window size for WTRU grant request evaluation |

One more parameter that may need to be signaled is whether a token bucket is allowed to become negative or not. This additional parameter allows for different variants of token bucket implementations. For example, some WTRU's 210 may want to check whether there are a sufficient number of tokens to send a packet, whereas other implementations of token buckets will allow the WTRU 210 to send the packet as long as the number of tokens is greater than 0. In the latter implementation, the token bucket is allowed to become negative. Whether a token bucket implementation allows for negative tokens buckets or not can be an additional signaling parameter, with either the WTRU 210 signaling the parameter to the eNB 220, or with the network signaling it to the WTRU 210 via the eNB 220. A combination of signaling may also be supported.

Table 3 below shows example token bucket parameters that may be signaled in addition to the parameters shown in Table 2.

TABLE 3

| Bearer | Bucket | Parameter |
|---|---|---|
| GBR bearer 1 | GBR token bucket | GBR |
| | | GBRtokenbucketsize (GBRtbs) |
| | | GBRinter-token arrival period (GBRitap) |
| | MBR token bucket | MBR |
| | | MBRtokenbucketsize (MBRtbs) |
| | | MBRinter-token arrival period (MBRitap) |
| GBR bearer 2 | GBR token bucket | GBR |
| | | GBRtokenbucketsize (GBRtbs) |
| | | GBRinter-token arrival period (GBRitap) |
| | MBR token bucket | MBR |
| | | MBRtokenbucketsize (MBRtbs) |
| | | MBRinter-token arrival period (MBRitap) |
| Non-GBR bearer 3 | Min-BR token bucket | MinBR |
| | | MinBRtokenbucketsize (MinBRtbs) |
| | | MinBRinter-token arrival period (MinBRitap) |

TABLE 3-continued

| Bearer | Bucket | Parameter |
|---|---|---|
| Non-GBR bearer 4 | Min-BR token bucket | MinBR<br>MinBRtokenbucketsize (MinBRtbs)<br>MinBRinter-token arrival period (MinBRitap) |
| Non-GBR bearers | aMBR token bucket | aMBR<br>aMBRtokenbucketsize (aMBRtbs)<br>aMBRinter-token arrival period (aMBRitap) |

It is possible that a large number of parameters may need to be signaled through the RRC message at the RB establishment or modification stage. Since token bucket related parameters are semi-static and do not need to be updated in every grant, if token bucket related parameters have to be signaled, the network does not necessarily need to include those parameters, (e.g., bucket size, inter-token arrival time, and the like), in every grant. Instead, the parameters can be signaled initially at the RB establishment or during RB modification. If any of the token bucket parameters described in Table 2 or Table 3 need to be updated, then only those parameters need to be signaled from the eNB 220 to the WTRU 210. Accordingly, utilizing the parameters described in Table 2 and 3, the capability of the WTRU 210, such as a "range" and/or "granularity" of token inter-arrival times that the WTRU 210 can support, and the minimum and/or maximum bucket size the WTRU 210 can support, and the like, are signaled. For example, these parameters may be signaled at the RB establishment or modification stage through an RRC connection re-configuration message.

As an alternative to the parameters defined in Tables 2 and 3, a table may be predefined for each RB with different variations of each token bucket related parameter labeled with index. The index of each token related parameter for that RB may then be signaled. An index may also be provided for different combinations of token related parameters for one RB, where only one index for that RB's related token parameters is signaled. The parameters for GBR, and non-GBR, such as GBR and MBR token buckets, may share one index table for signaling purposes. Alternatively, an index may be provided for different token related parameters for different RB's into one table. However, if there is only one set of parameters for GBR or MBR of one RB, then these parameters can be pre-defined, such as in the standard, and signaling may not be required. Accordingly, the index may include parameters related to one RB or for parameters that are related to multiple RBs.

The WTRU 210 may also store token-related parameters locally and communicate appropriate parameters to the network. For example, the WTRU 210 may have its own implementation-dependent token bucket size, inter-token arrival period. In this case it may notify the network through signaling these parameters if necessary. In one example, the signaling may be in the form of a WTRU capability information report.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method implemented in a wireless transmit/receive unit (WTRU), the method comprising:

maintaining token buckets for respective radio bearers (RBs);

determining current buffer status information, wherein the current buffer status information includes (i) values of the token buckets and (ii) buffer levels associated with the RBs, wherein the buffer levels are indicative of respective amounts of uplink (UL) data for transmission via the RBs;

triggering a buffer status report (BSR) responsive to one or more buffer levels exceeding respective thresholds, and wherein the BSR comprises the one or more buffer levels;

triggering a grant request in connection with the triggering of the BSR;

receiving a grant including an indication of an amount of UL resources; and utilizing the UL resources, wherein at least one of the values of the token buckets is a negative value after the UL resources are utilized.

2. The method of claim 1, wherein utilizing the UL resources comprises: utilizing the UL resources based on priority of the RBs and the values of the token buckets.

3. The method of claim 1, further comprising: determining that the at least one value is a negative value based on the values of the token buckets, priority of the RBs and the amount of UL resources.

4. The method of claim 3, wherein determining that the at least one value is a negative value comprises: subtracting a value representative of the amount of UL data for one of the RBs for which the UL resources are utilized from the value of the token bucket for the one RB.

5. The method of claim 1, wherein utilizing the UL resources comprises: scheduling transmission of the UL data based on priority of the RBs and the amount of UL resources.

6. The method of claim 1, wherein maintaining token buckets for RBs comprises: maintaining maximum values of token buckets.

7. The method of claim 6, further comprising: receiving signaling including information for configuring the maximum values of the token buckets.

8. The method of claim 6, wherein the thresholds are based on the maximum values of the token buckets.

9. The method of claim 1, wherein the RBs comprise a high-priority RB and a non-high-priority RB, and wherein the one or more buffer levels comprise a buffer level associated with the high-priority RB and a buffer level associated with the non-high-priority RB.

10. The method of claim 9, wherein the respective thresholds comprise a threshold for the buffer level of the high-priority RB and a threshold for the buffer level of the non-high-priority RB.

11. The method of claim 1, wherein maintaining token buckets for RBs comprises changing the values of the token buckets for the RBs for which the UL resources are utilized.

12. A wireless transmit/receive unit (WTRU) comprising:

a receiver;

a transmitter; and a processor in communication with the receiver and the transmitter, wherein the processor is configured to:

maintain token buckets for respective radio bearers (RBs);

determine current buffer status information, wherein the current buffer status information includes (i) values of the token buckets and (ii) buffer levels associated with the RBs wherein the buffer levels are indicative of respect amounts of uplink (UL) data for transmission via the RBs;

trigger a buffer status report (BSR) responsive to one or more buffer levels exceeding respective thresholds, and wherein the BSR comprises the one or more buffer levels;

trigger a grant request in connection with the triggering of the BSR;

receive a grant including an indication of an amount of UL resources; and utilize the UL resources, wherein at least one of the values of the token buckets is a negative value after the UL resources are utilized.

13. The WTRU of claim 12, wherein the processor is configured to utilize the UL resources based on priority of the RBs and the values of the token buckets.

14. The WTRU of claim 12, wherein the processor is configured to determine that the at least one value is negative value based on the values of the token buckets, priority of the RBs and the amount of UL resources.

15. The WTRU of claim 12, wherein the processor is configured to determine that the at least one value is a negative value by subtracting a value representative of the amount of UL data for one of the RBs for which the UL resources are utilized from the value of the token bucket for the one RB.

16. The WTRU of claim 12, wherein the processor is configured to maintain maximum values of token buckets.

17. The WTRU of claim 16, wherein the processor is configured to: receive signaling including information for configuring the maximum values of the token buckets.

18. The WTRU of claim 16, wherein the thresholds are based on the maximum values of the token buckets.

19. The WTRU of claim 12, wherein the RBs comprise a high-priority RB and a non-high-priority RB, and wherein the one or more buffer levels comprise a buffer level associated with the high-priority RB and a buffer level associated with the non-high-priority RB.

20. The WTRU of claim 19, wherein the respective thresholds comprise a threshold for the buffer level of the high-priority RB and a threshold for the buffer level of the non-high-priority RB.

21. The WTRU of claim 12, wherein the processor is configured to: changing the values of the token buckets for the RBs for which the UL resources are utilized.

22. The WTRU of claim 12, wherein the processor is configured to utilize the UL resources by scheduling transmission of the UL data based on priority of the RBs and the amount of UL resources.

* * * * *

UNITED STATES PATENT AND TRADEMARK OFFICE

CERTIFICATE OF CORRECTION

PATENT NO. : 9,042,231 B2
APPLICATION NO. : 14/198403
DATED : May 26, 2015
INVENTOR(S) : Peter S. Wang et al.

It is certified that error appears in the above-identified patent and that said Letters Patent is hereby corrected as shown below:

(i) in the specification, at col. 4, line 8, "¼ to 100" should read --¾ to 100--

(ii) in the specification, at col. 5, line 16, "For an absolute grant, it the" should read --For an absolute grant, the--

Signed and Sealed this
Seventh Day of June, 2016

Michelle K. Lee
*Director of the United States Patent and Trademark Office*